Aug. 25, 1936.    M. DORNIG ET AL    2,052,342
SHAFT COUPLING DEVICE
Filed Feb. 10, 1934
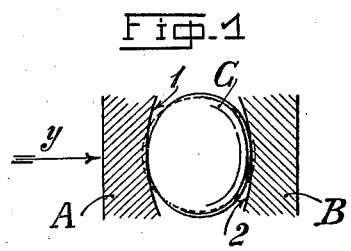
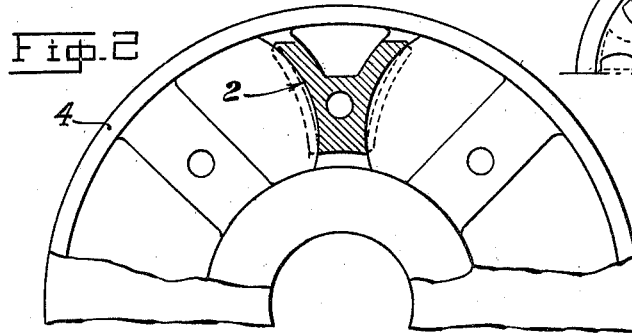
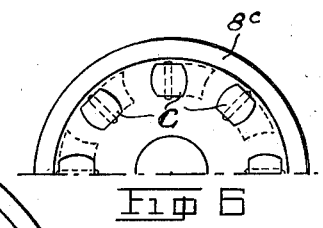
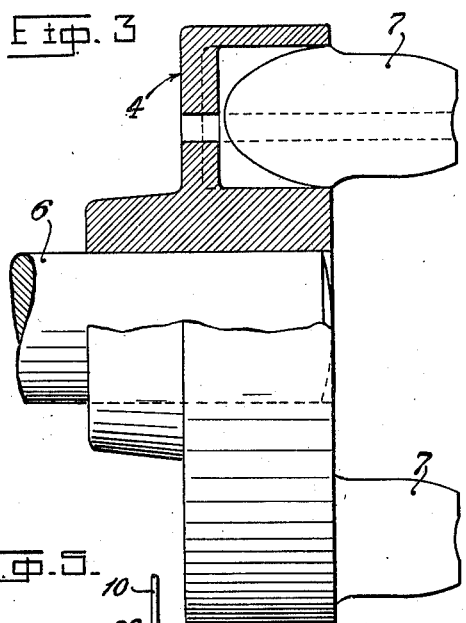
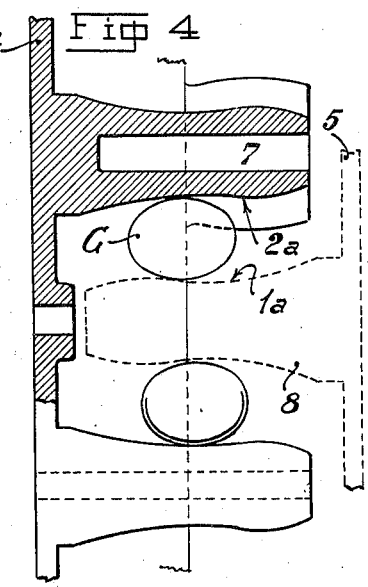
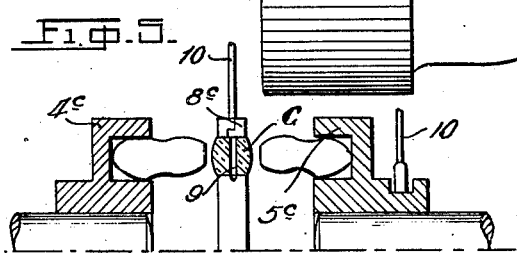

Patented Aug. 25, 1936

2,052,342

UNITED STATES PATENT OFFICE 2,052,342

SHAFT COUPLING DEVICE

Mario Dornig, Milan, and Felice Fauser, Novara, Italy

Application February 10, 1934, Serial No. 710,754
In Italy February 15, 1933

2 Claims. (Cl. 64—14).

The present invention has for its subject matter a shaft coupling device for the transmission of power from a driving mechanical element or shaft to a driven element through elastic means.

The operation of the invention is characterized by the fact that the transmission of the stress from the driving to the driven element takes place across spheroidal bodies of plastic material, preferably india rubber, susceptible of considerable elastic deformation.

The device for carrying into practice such operation is characterized by the fact that it comprises at least one driving member conjugated with at least one driven member, between which two members—between suitable concave surfaces—is arranged at least one spheroidal body of plastic-elastic material, preferably india rubber, in such a manner that the transmitting action takes place through a compression of the said spheroidal body.

In the above definitions of the method and device the denomination of "spheroidal body" is not meant as having a limiting character in respect to the form of the body, the denomination being meant to comprise also bodies the shape of which can be assimilated to the spherical shape either in respect to their total surface or to a fair portion thereof.

As a chief object, the invention permits the practical realization of elastic couplings that are advantageous in comparison with those heretofore known, especially from the standpoint of a great simplification in the construction. The construction, namely, draws a benefit from the improvement inasmuch as the number of parts is reduced, and it is rendered practicable to use parts that require a minimum of workmanship and parts (solid rubber spheres) of almost insignificant cost.

In the above broad definition of the device it has been stated that the surfaces intended to compress the spheroidal bodies of plastic material should be concave. This is to be understood only as an advantageous indication, because experience has demonstrated that, the compression effort being equal, a spheroidal body of plastico-elastic material (solid rubber sphere) shows a better behaviour when the pressure surfaces are concave than when they are flat. Accordingly, surfaces of greater or lesser concavity may be used in practice, as well as pressure surface pairs in which one of surfaces is flat and the other concave. This will lead of course to possible but not to the best results.

The invention will now be described by reference to the accompanying drawing which, however, is meant only for explanation purposes and not as limiting the range of the invention.

Fig. 1 in the drawing is a diagram of an element of the novel device, in the case of the adoption of the type in which the driving push passes through the center of the plastico-elastic spheroidal body.

Figs. 2, 3 and 4 illustrate a specific form of an elastic coupling for the transmission of power between shafts, based on the diagram shown in Fig. 1, more precisely:

Fig. 2 is an end view, partly in transverse section, of one of the similar coupling elements as the driven half.

Fig. 3 is a side elevation, half in longitudinal section, of the same coupling-half;

Fig. 4 is a cylindrical section or development through the lugs or claws of Fig. 2.

Figs. 5 and 6 diagrammatically show a dismountable coupling.

The method according to the invention consists in the fact that the transmission of the stress $y$ from the driving element A to the driven element B takes place across a spheroidal body C of plastic material susceptible of considerable elastic deformation, preferably a rubber sphere.

As will be gathered from Fig. 1, the surfaces 1—2 embracing the spheroidal body are concave; this to the object of improving the conditions for the reaction of the spheroidal body to the compression stress determined by the transmitting or entraining push $y$.

In the diagram shown in Fig. 1, the push $y$ is transmitted in substantially diametral direction from the driving element A to the driven element B, and conversely when the functions of the two elements are reversed.

It is apparent that the diagram shows the essential parts of the device embodying the method, the said parts being susceptible of numerous and widely different execution forms.

Referring in particular to Figs. 2 to 4, the elastic coupling comprises two coupling-halves 4 and 5 applicable on the respective parts of the shaft 6. The said coupling-halves have claws or projections 7 and 8 alternating with one another; between these claws are interposed the elastic bodies C of spheroidal shape. The two coupling-halves are similar. Before their being fitted between the claws 7 and 8, the said elastic bodies are of preferably spherical shape.

The claws 7 and 8, the side surfaces of which constitute the characteristic concave surfaces $1a$ and $2a$, are of such a profile that in the assembling operation the elastic bodies are gradually squeezed and caused to roll between the said surfaces, the introduction of the elastic bodies during the assembling operations being thus facilitated. More precisely, the profile of the claws is such (see Fig. 4) that at the assembling, when the two coupling-halves are gradually moved nearer to one another, at first—up to a certain point—an increasing squeezing of the elastic bodies is produced; after this, a decreasing squeezing till the definitive assemblage position is determined, so that when the coupling is at work the elastic bodies tend to retain the coupling halves in their definitive normal position.

It is apparent that half of the elastic bodies will be compressed when the stress is transmitted in one direction, the other half remaining inoperative. When the direction of the effort is reversed, the former half will remain inoperative and the latter half will be compressed.

Instead of spherical, the elastic bodies may be helicoidal, ovoidal, conical, or terminate in half-spheres etc.

In a possible modified execution form the elastic bodies may be arranged in a cage, so as to facilitate the engagement and disengagement of the coupling halves. Further, either one or both the coupling-halves may be arranged to be readily movable away from one another, so that the coupling may be made to work like a clutch. In such a case the cage guiding the elastic bodies may be actuated by a mechanism constantly tending to restore it into its center position between the two coupling halves whatever be position of the halves; in this manner the fitting-in and the extraction of the elastic bodies would be facilitated, when it is desired to let the coupling work like an ordinary clutch.

In the example illustrated in Figs. 5 and 6 the elastic bodies are threaded on pins 9 provided in the cage 8. The coupling half 5c is arranged to be slidable away from the coupling half 4c, as well as the cage 8 carrying the elastic bodies C. Suitable control means 10 and 11 will be provided to effect the sliding.

The interstices between the projections of one and those of the other coupling-half as well as the dimensions of the elastic bodies may be so designed as to ensure that, even with the revolving direction in which the transmission of the stress is practicable, when the said stress exceeds a certain preestablished limit the squeezing of the elastic bodies is such that the elastic bodies would get into the space existing between the two sets of projections, the two halves of the coupling being thus allowed to freely revolve one relatively to the other. In this manner the transmission of a stress exceeding the preestablished limit will be rendered impossible and the coupling will therefore work as a safety coupling.

Having now described our invention and how the same is to be carried out, what is claimed as our invention is:

1. A cushioned coupling device for mechanically transmitting power from a driving to a driven shaft, comprising rotary driving and driven members in fixed coaxial alinement, the driving and driven members having complementary series of axially extending lugs, with facing complementary concave engaging portions, and a series of transmitting spheroidal bodies of elastically compressible material as rubber, each body being interposed and confined between a pair of such concave driving and driven lug portions, said lug portions and elastic body being so relatively arranged that the transmitting stresses operate compressibly on the body substantially at right angles to a plane extended through the rotation axis and the center portion of the body; and said members and bodies being adapted to be assembled by axial approaching movement, the lugs of said complementary series having for this purpose a relatively flared configuration whereby first to roll and progressively compress the bodies in the act of assembling the device, followed by the said concave lug portions wherein the bodies are then relaxed and allowed to expand as they come into operating position.

2. A cushioned coupling device for mechanically transmitting power from a driving to a driven shaft, comprising rotary driving and driven members in fixed coaxial alinement, the driving and driven members having complementary series of axially extending lugs, with facing complementary concave engaging portions, and a series of transmitting spheroidal bodies of elastically compressible material as rubber, each body being interposed and confined between a pair of such concave driving and driven lug portions, said members with their lug portions and said elastic bodies being adapted to be assembled by axial approaching movement, the lugs of said complementary series having for this purpose a relatively flared configuration whereby first to roll and progressively compress the bodies in the act of assembling the device, followed by the said concave lug portions wherein the bodies are then relaxed and allowed to expand as they come into operating position, and the series of elastic bodies having a cage arranged to support them in circular spaced relation before and during and after such axial assembling and disassembling, the cage being spaced axially from both the driving and driven members when disassembled.

MARIO DORNIG.
FELICE FAUSER.